June 20, 1944.    O. R. PETERSON ET AL    2,351,876
FLUID PRESSURE CONTROLLED CLUTCH
Filed June 23, 1942    2 Sheets-Sheet 1

INVENTORS
Oscar Raymond Peterson
BY Fred H. Stevens

ATTYS

Patented June 20, 1944

2,351,876

UNITED STATES PATENT OFFICE 2,351,876

FLUID PRESSURE CONTROLLED CLUTCH

Oscar Raymond Peterson and Fred H. Stevens, Peoria, Ill., assignors to R. G. Le Tourneau, Inc., Stockton, Calif., a corporation of California Application June 23, 1942, Serial No. 448,082

5 Claims. (Cl. 192—85)

The present invention is an improvement in the clutch art, and the invention is directed in particular to, and it is the principal object to provide, a clutch which is controlled by fluid under pressure; air being the pressure medium employed in the present structure.

Another object of the invention is to provide a fluid pressure controlled clutch which is designed so that it does not require adjustment for clutch lining wear; movement of the clutch members by the fluid under pressure always being sufficient to automatically compensate for lining wear.

A further object is to provide a fluid pressure controlled clutch whose design is such that the fluid under pressure is fed to the clutch expansion chambers through a system including a bore in the clutch supporting shaft; the use of such a fluid pressure feed system making possible the mounting of said clutches in dual relation, or in banks, on a common shaft for operation from a common source of fluid under pressure.

An additional object of this invention is to provide a fluid pressure controlled clutch which is constructed so that it may be mounted on an unbroken shaft intermediate its ends so as to enable said shaft to continue beyond the clutch in either direction for coupling to other driven or drive parts.

It is also an object of this invention to provide a fluid pressure controlled clutch which is constructed, particularly as to the fluid pressure feed means, so that the clutch is well balanced, permitting its use in high speed drives.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
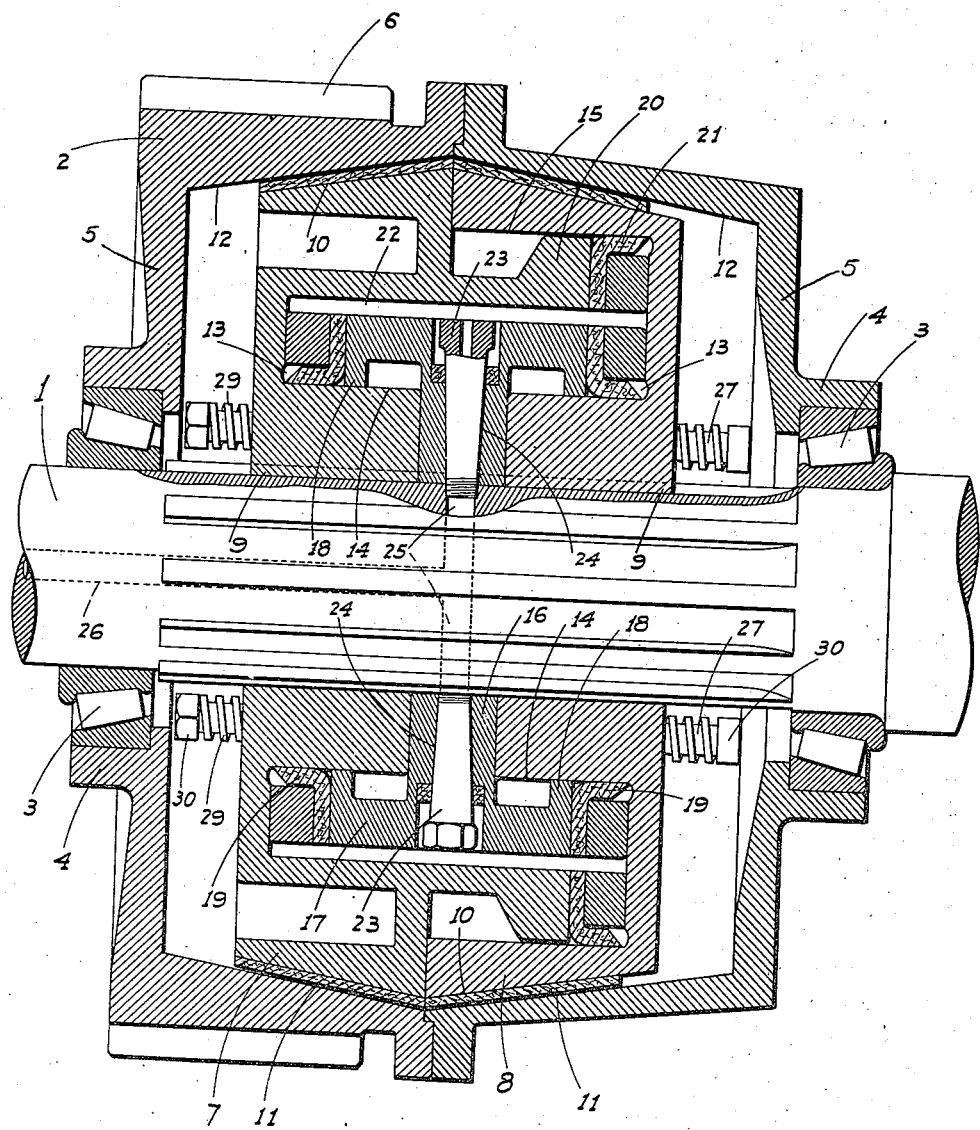
Figure 1 is a longitudinal sectional elevation of the clutch showing the parts in normal or released position.
Figure 2:
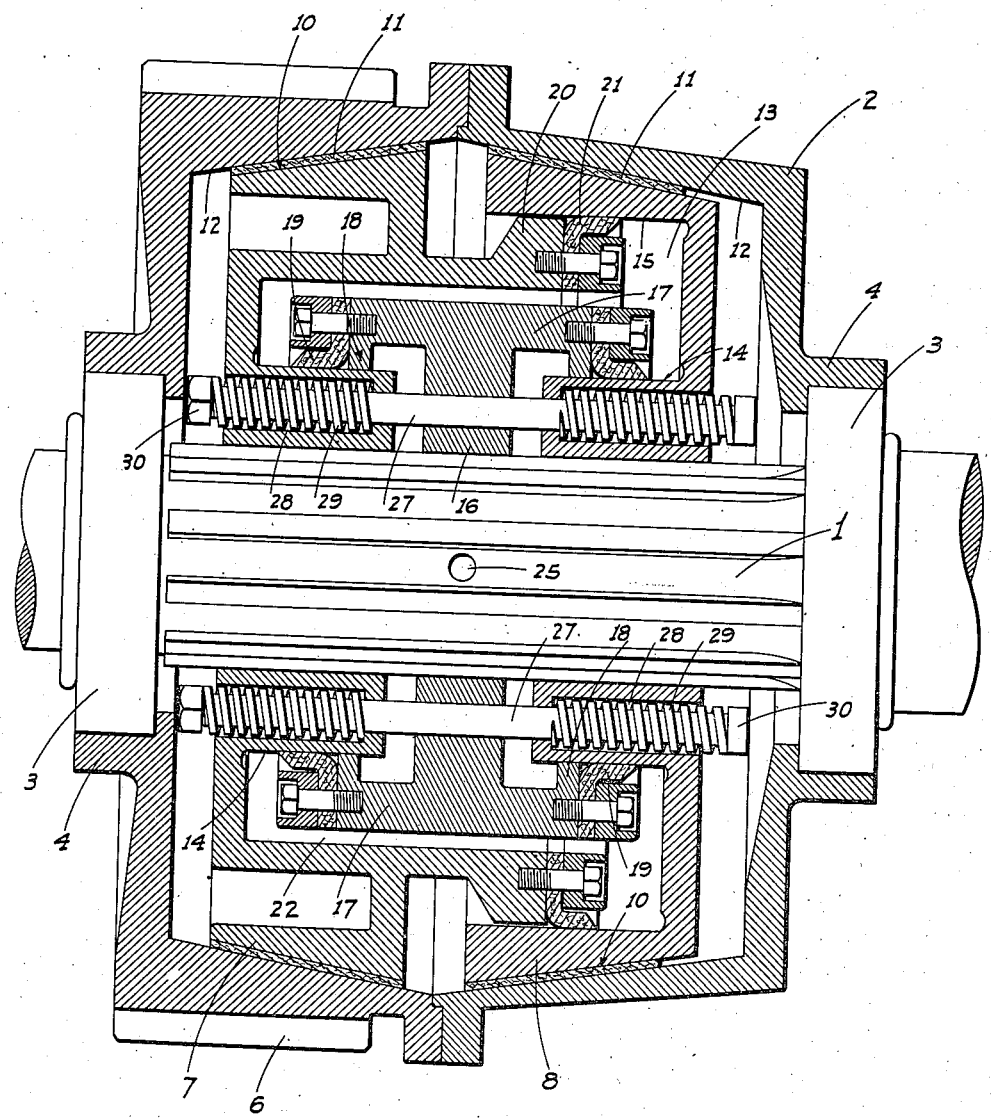
Figure 2 is a longitudinal sectional elevation of the clutch showing the parts in driving engagement.

Referring now more particularly to the characters of reference on the drawings, the numeral 1 indicates the shaft upon which the clutch is supported; the clutch including and being enclosed by a circular housing 2 of substantial length and diameter. The housing 2 is rotatably mounted on the shaft 1 by means of "Timken" or similar bearings 3 fitted in bearing bosses 4 on the end walls 5 of housing 2. The housing is formed adjacent one end and about its periphery with a gear 6; the clutch in its present embodiment being employed to couple the shaft 1 and gear 6 in driving relation.

A pair of clutch cones 7 and 8 are disposed within housing 2 in end to end relation and are splined, as at 9, to shaft 1 to connect said cones in axially slidable, but non-turnable relation to said shaft. The peripheral or male clutch faces 10 of said cones are disposed in oppositely sloping relation, and are fitted with clutch linings indicated at 11. The adjacent and inner surfaces of the housing 2 are formed as matching female clutch faces 12.

The cones between shaft 1 and male clutch faces 10 are channeled to form annular expansion chambers 13 which open to the adjacent or inner sides of said cones; said chambers being of substantial depth. The radially innermost walls 14 of said chambers are parallel to the shaft, and said walls 14 of the corresponding cones are alined with each other. The chamber 13 in cone 8 is of a substantially greater radial extent than the chamber in the other cone 7, and the radially outermost wall 15 thereof is parallel to walls 14.

A circular, central hub 16 is fixed on shaft 1 between the cones 7 and 8; the portion of said cones inwardly of the chambers 13 abutting against the sides of said hub when the clutch is in its normal and released position.

Annular flanges 17 project in opposite directions into the chambers 13 from the hub; said flanges being parallel to said radially innermost walls 14 of said chambers, and are lipped, as at 18, to ride said walls in sliding relation thereto. The flanges 17 at their outer ends are fitted with annular cup leathers 19 which slidably engage walls 14 in air-tight relation.

The cone 7 is formed with a concentric annular flange 20 which overhangs hub 16 and projects into chamber 13 in cone 8; the radially outermost face of said flange 20 closely abutting, in sliding relation, the radially outermost wall 15 of said chamber. This flange 20, at its outer end, is fitted with an annular cup leather 21 which engages said adjacent wall 15 in air-tight but slidable relation.

The radially outermost wall 15 of chamber 13 in cone 8 and the corresponding surface of flange 20 are spaced radially outward from hub 16 and flanges 17 forming an annular air passage 22 therebetween which connects both of said chambers 13.

Diametrally opposed nipples 23 are seated in bores 24 in hub 16; the outer ends of said nipples communicating with passages 22, while the inner ends of said nipples are threaded into laterals 25 of an axial bore 26 in shaft 1.

A plurality of rods 27 extend in circumferentially spaced relation through the hub 16 parallel to the shaft 1, and through sockets 28 formed in the cones 7 and 8 and opening to opposite or outer sides thereof.

Compression springs 29 are seated in said sockets about the rods, and the rods 27 are fitted with heads 30 which engage the outer ends of the springs and normally hold the same under compression. As shown, one of the heads 30 may be a nut threaded on the rod, whereby compression of the springs may be set to the proper degree.

In use, the clutch is normally released, the cones 7 and 8 being urged toward each other and into engagement with the hub 16 by the springs 29; the clutch linings 11 then being out of engagement with the female clutch faces 12.

To engage the clutch, and couple the shaft 1 and gear 6 in driving relation, air under pressure is introduced into shaft bore 26 from a suitable source and under the control of a manually actuated valve (not shown). The air under pressure feeds from bore 26 through laterals 25 and nipples 23 into the annular passage 22 and thence passes to the respective expansion chambers 13.

Upon creation of pressure in said chambers, the cones, under the influence of such pressure, move axially in opposite or separating directions, causing the linings 11 on male faces 10 to forcefully engage with the female faces 12. This locks the cones with housing 2, and the cones and the housing together with the gear 6 rotate as a unit.

To release the clutch, it is only necessary to vent the air pressure through bore 26, and which is accomplished through the manually actuated valve (not shown), whereupon the springs 29 return the cones to released position.

It will be seen that as wear occurs on linings 11, no manual adjustment is necessary as the air under pressure in the expansion chambers 13 will merely and automatically move the cones a slightly greater distance than initially, to effect the necessary driving engagement between the clutch members.

The advantages which accrue from the above described clutch structure reside in the fact that no mechanical connections or linkages are necessary to control the clutch; the clutch is positive in its operation, and slippage is reduced to a minimum; the clutch can be mounted on a shaft without the necessity of any break in the latter; and if desired a number of the clutches intended for multiple drives or the like may be mounted on a common shaft, and all actuated from a common control station.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A fluid pressure controlled clutch including with a shaft, a concentric housing rotatably but axially immovably mounted on the shaft, a pair of clutch members slidably but non-rotatably mounted on the shaft in the housing, clutch faces on said members, adjacent and matching clutch faces on the housing, the faces on the members being adapted to engage the faces on the housing in driving relation upon axial separating movement of said members, a hub disposed on the shaft between said clutch members, adjacent sides of said members having an annular channel therein concentric to the shaft, annular flanges projecting from the hub into the channels whereby to form expansion chambers, the radially outermost surface of said flanges being spaced from the corresponding wall of said channels forming annular passages in communication with the chambers, and passage means for fluid under pressure arranged in communication with said annular passages; said passage means including a longitudinal bore in a portion of the shaft, opposed laterals extending from said bore to the exterior of the shaft, and nipples threaded into said laterals and projecting through the hub to communicate with said annular passages, the nipples securing said hub against relative movement lengthwise of said shaft.

2. A fluid pressure controlled clutch including, with a shaft, a concentric housing rotatably but axially immovably mounted on the shaft, a pair of clutch members slidably but non-rotatably mounted on the shaft in the housing, clutch faces on said members, adjacent and matching clutch faces on the housing, the faces on the members being adapted to engage the faces on the housing in driving relation upon axial separating movement of said members, a hub disposed on the shaft between said clutch members, means forming an expansion chamber between the clutch members radially out from the hub, the clutch members being urged in an axially separating direction upon introduction of fluid pressure into said chamber, there being a fluid pressure passage between said hub and chamber, the shaft having a longitudinal bore in a portion thereof and a lateral extending from said bore to the exterior of the shaft, and a nipple threaded into said lateral and projecting through the hub to communicate with said passage, the nipple securing the hub against movement relative to said shaft.

3. A fluid pressure controlled clutch including with a shaft, a concentric housing rotatably but axially immovably mounted on the shaft, a pair of clutch members slidably but non-rotatably mounted on the shaft in the housing, clutch faces on said members, adjacent and matching clutch faces on the housing, the faces on the members being adapted to engage the faces on the housing in driving relation upon axial separating movement of said members, a hub fixed on the shaft between said clutch members, adjacent sides of said members having an annular channel therein concentric to the shaft, annular flanges projecting from the hub into the channels whereby to form expansion chambers, the radially outermost surface of said flanges being spaced from the corresponding wall of said channels forming annular passages in communication with the chambers, and passage means for fluid under pressure arranged in communication with said annular passages; there being another annular flange formed on one clutch member and projecting into the channel in the other member, engaging the radially outermost wall of the latter, said annular passages being in a circumferential plane between the annular flanges on the hub and said other annular flange.

4. A fluid pressure controlled clutch including, with a shaft, a concentric housing rotatably but axially immovably mounted on the shaft, a pair of clutch members slidably but non-rotatably mounted on the shaft in the housing, clutch faces on said members, adjacent and matching clutch faces on the housing, the faces on the members being adapted to engage the faces on the housing in driving relation upon axial separating movement of said members, pressure fluid means operative to effect axial separating movement of the members, and spring means normally urging said members toward each other; said spring means comprising a plurality of circumferentially spaced rods disposed parallel to but spaced radially from the shaft, said rods slidably projecting through said pair of clutch members, heads on opposite ends of said rods, and loaded compression springs on the rods between each head and the corresponding clutch member.

5. A fluid pressure controlled clutch including, with a shaft, a concentric housing rotatably but axially immovably mounted on the shaft, a pair of clutch members slidably but non-rotatably mounted on the shaft in the housing, clutch faces on said members, adjacent and matching clutch faces on the housing, the faces on the members being adapted to engage the faces on the housing in driving relation upon axial separating movement of the members, and spring means normally urging said members toward each other; there being a hub fixed on the shaft between said clutch members, and said spring means comprising a plurality of circumferentially spaced rods disposed parallel to but spaced radially from the shaft, the hub having corresponding bores through which the rods slidably project intermediate their ends in supported and guided relation, said rods projecting from opposite sides of the hub through said clutch members in relatively slidable relation, heads on opposite ends of said rods, and loaded compression springs on the rods between each head and the corresponding clutch member.

OSCAR RAYMOND PETERSON.
FRED H. STEVENS.